United States Patent [19]
Kalisz et al.

[11] Patent Number: 5,333,817
[45] Date of Patent: Aug. 2, 1994

[54] BALLONET SYSTEM FOR A LIGHTER-THAN-AIR VEHICLE

[75] Inventors: John B. Kalisz, Newhall; Mark H. Wexler, Studio City, both of Calif.

[73] Assignee: Lockheed Corporation, Calabasas, Calif.

[21] Appl. No.: 155,363

[22] Filed: Nov. 22, 1993

[51] Int. Cl.$^5$ .............................................. B64B 1/62
[52] U.S. Cl. ...................................... 244/97; 244/98; 244/30; 244/128
[58] Field of Search ................. 244/12.1, 100 A, 30, 244/23 R, 96, 97, 98, 99, 125, 128, 905; 180/116, 128; 52/2.11, 2.18

[56] References Cited

U.S. PATENT DOCUMENTS

| | | | |
|---|---|---|---|
| 970,262 | 9/1910 | Parseval | 244/97 |
| 1,445,424 | 2/1923 | Upson | 244/97 |
| 1,475,210 | 1/1923 | Upson . | |
| 1,580,004 | 4/1926 | Bradford . | |
| 1,797,502 | 3/1931 | Hall . | |
| 2,331,404 | 10/1943 | Liebert . | |
| 3,964,698 | 6/1976 | Earl | 244/100 A |
| 4,008,983 | 2/1977 | Flatt et al. | 244/905 |
| 5,143,322 | 9/1992 | Mason | 244/96 |

FOREIGN PATENT DOCUMENTS 2196919  5/1988  United Kingdom ................ 244/128

*Primary Examiner*—Galen L. Barefoot
*Attorney, Agent, or Firm*—Louis L. Dachs

[57] ABSTRACT

The invention is a ballonet system for a lighter-than-air-vehicle, the vehicle having a lift producing gasbag and a longitudinal, vertical and lateral axis. In detail, the ballonet system includes a plurality of ballonets located within the gasbag positioned along the longitudinal axis and on each side of the vertical axis of the vehicle. Each of the ballonets include a flexible sheet joined at its periphery thereof to a portion of the wall of the gasbag. A ballonet pressurization system is coupled to each ballonet for pressurizing them with air that includes the portion of the wall of the gasbag forming the ballonet having a plurality of holes therethrough. A manifold having an inlet port is joined to the wall covering the holes therein and is adapted to diffuse the pressurized air entering therein. Also included is at least one fan having an inlet port coupled to ambient atmosphere and an outlet port coupled to the inlet port of the manifold for providing pressurized air to the interior thereof. A check valve located in the outlet port of the fan is provided for preventing air from flowing from the interior of the manifold out the inlet port of the fan. A ballonet venting system is included for venting the interior of the ballonet to ambient atmosphere.

6 Claims, 4 Drawing Sheets

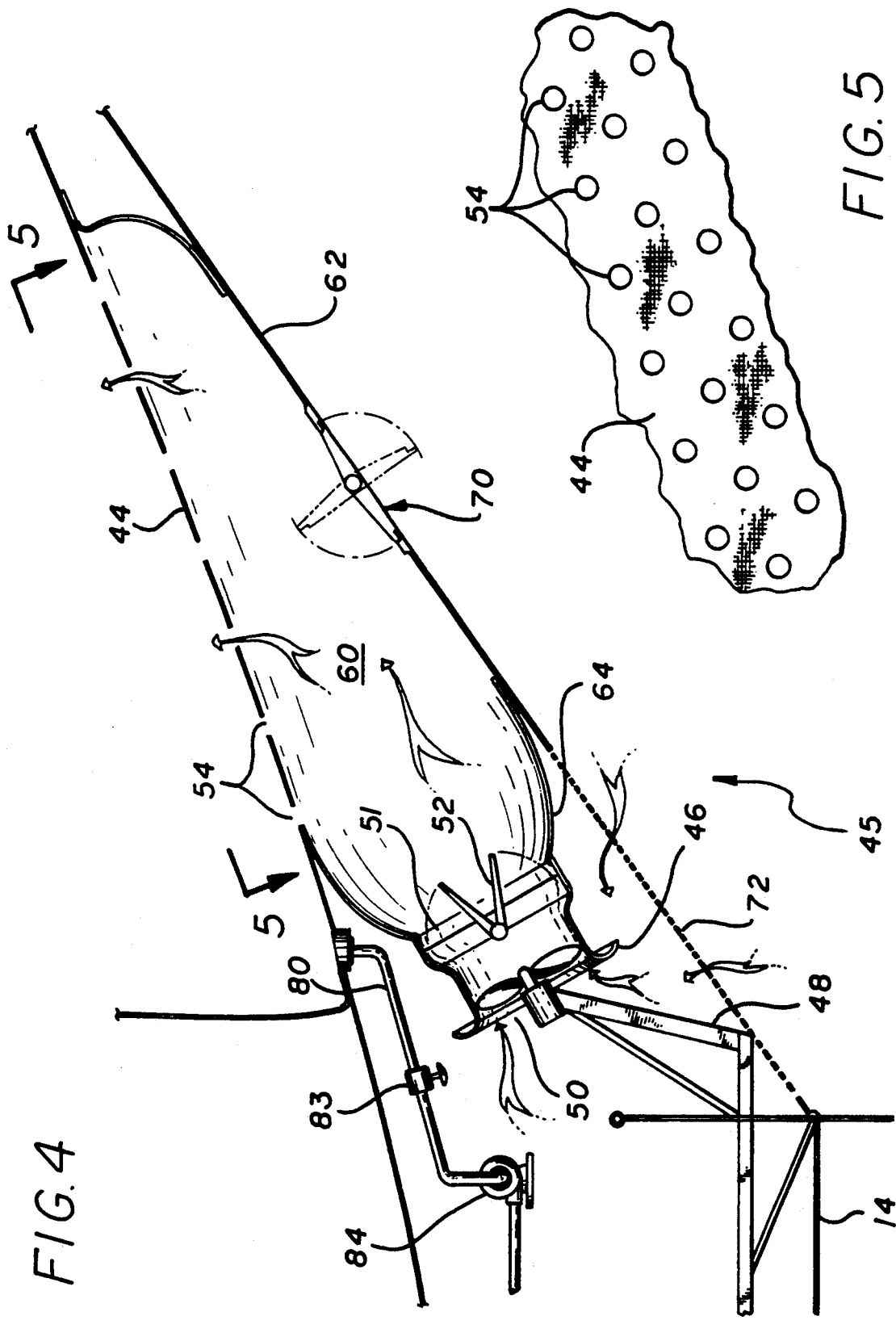

BALLONET SYSTEM FOR A LIGHTER-THAN-AIR VEHICLE

BACKGROUND OF THE INVENTION

1. Field of the Invention

The invention relates to the field of lighter-than-air vehicles and, in particular, to an improved ballonets and a system for pressurizing same.

2. Description of Related Art

There are three general types of non-rigid vehicles: those comprising a single gas filled bag; several gasbags joined together in series; and, of course, those having a multiple number of gasbags within a non-rigid envelope. One of the major problems with non-rigid lighter-than-air vehicles is keeping the bag from bursting as the ambient pressure decreases with altitude or from collapsing when desending from altitude. The main method of preventing such events is to incorporate ballonets in the vehicle, which are inflatable gasbags within the Helium bag. The vehicle is designed to fly with partially inflated ballonets that can be inflated with air, causing the Helium volume to contract or, deflated, causing the Helium volume to expand. Thus, at altitude, the ballonets may be almost collapsed, providing the necessary "room" for the Helium to expand as ambient air pressure has decreased. As the vehicle desends into denser atmosphere, the ballonets are inflated to insure that the Helium gasbag does not collapse or even locally sag. Additionally, ballonents can play a roll in altitude control. An example of ballonets installed on a lighter-than-air vehicle can be found in U.S. Pat. No. 5,143,322, "Ground Handling, Altitude Control And Longitudinal Stability Of Airships" by E. W. Mason.

Prior art methods of pressurizing and filling the ballonets typically involved the use of ram air scoops. Examples of this type system can be found in U.S. Pat. No. 1,475,210, "Airship" by R. H. Upson and U.S. Pat. No. 2,331,404, "Airship" by H. R. Liebert. In the Liebert design, the ram air scoops are located behind the propellers and thus less dependent upon the speed of the airship. However, if the ship were at very low speeds filling, of course, would be proportionally slower. This would be true even with the Liebert design, because the speed of the airship is proportional to the rotational speed of the propeller.

In U.S. Pat. No. 1,580,004, "Airship" by A. Bradford and U.S. Pat. No. 1,797,502, "Airship by C. S. Hall separate pumps are used for pressurizing the ballonets. Additionally, the Hall design provide heaters to heat the pressurized air. Since the ballonet is located in the middle of the main Helium filled gasbag, heating of the Helium could also be accomplished. The problem with these designs is that the ballonets are located centrally and fill valves and lines are, necessarily, co-located. Thus they are difficult to reach for maintenance and repair or removal. Additionally, the need for such fill valves and lines add weight.

Thus, it is a primary object of the invention to provide a ballonet system for a lighter-than-air vehicle.

It is another primary object of the invention to provide a ballonet system for a lighter-than-air-vehicle that is independent from other systems of the vehicle.

It is a further object of the invention to provide a ballonet system for a lighter-than-air vehicle that allows the volume of air in each ballonet to be individually varied.

A still further object of the invention is to provide a ballonet system for a lighter-than-air vehicle that provides rapid filling and venting of the individual ballonets.

SUMMARY OF THE INVENTION

The invention is a ballonet system for a lighter-than-air-vehicle, the vehicle having a lift producing gasbag and a longitudinal, vertical and lateral axis. In detail, the ballonet system includes a plurality of ballonets located within the gasbag positioned along the longitudinal axis and on each side of the vertical axis of the vehicle in equal numbers. Each of the ballonets is made up of a flexible sheet joined at the periphery thereof to a portion of the wall of the gasbag.

A ballonet pressurization system is coupled to each ballonet for pressurizing the ballonet with air that includes the portion of the wall of the gasbag forming the ballonet having a plurality of holes therethrough. A manifold having at least one inlet port is joined to the wall covering the holes therein and adapted to diffuse the pressurized air entering therein. The manifold is, preferably, structurally ridged with the inlet port thereof made of a flexible material. At least one fan having an inlet port is coupled to ambient atmosphere and an outlet port coupled to the at least one inlet port of the manifold and provides pressurized air to the interior thereof. If the vehicle is of the type that includes a gondola suspended under the gasbag, the fan is, preferably, mounted thereon, with the relative movement between the manifold and the fan absorbed by the flexible inlet.

A check valve is located in the outlet port of the fan for preventing air from flowing from the interior of the manifold out of the inlet port of the fan. A ballonet venting system, preferably in the form of one or butterfly valves is mounted on the manifold for venting the interior of the ballonet to ambient atmosphere. Finally, the ballonet system includes a means to drain the ballonet of liquids contained therein, which takes the form of a drain tube coupled to the bottom of the ballonet with a valve mounted in the drain tube and pump means to drain the ballonet.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 4 is an enlarged view of a portion of FIG. 3, particularly illustrating the pressurization system for the ballonet system.

FIG. 5 is a partial cross-section view of FIG. 4 particularly illustrated the holes in the wall of the gasbag for pressurizing and de-pressurizing an individual ballonet.

DESCRIPTION OF THE PREFERRED EMBODIMENT

Figure 1:
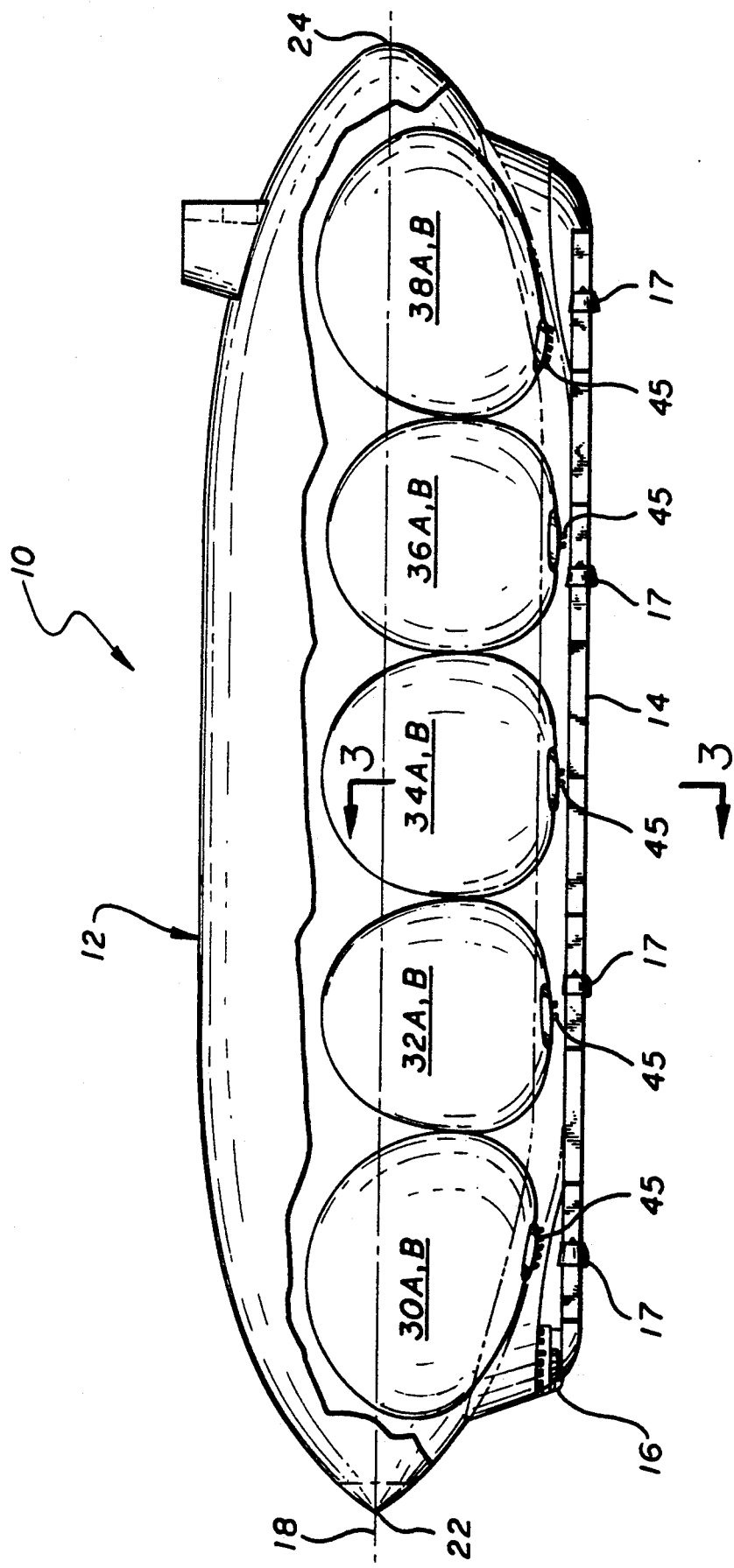
FIG. 1 is a side view of the lighter-than-air vehicle incorporating the subject ballonet system.
Figure 2:
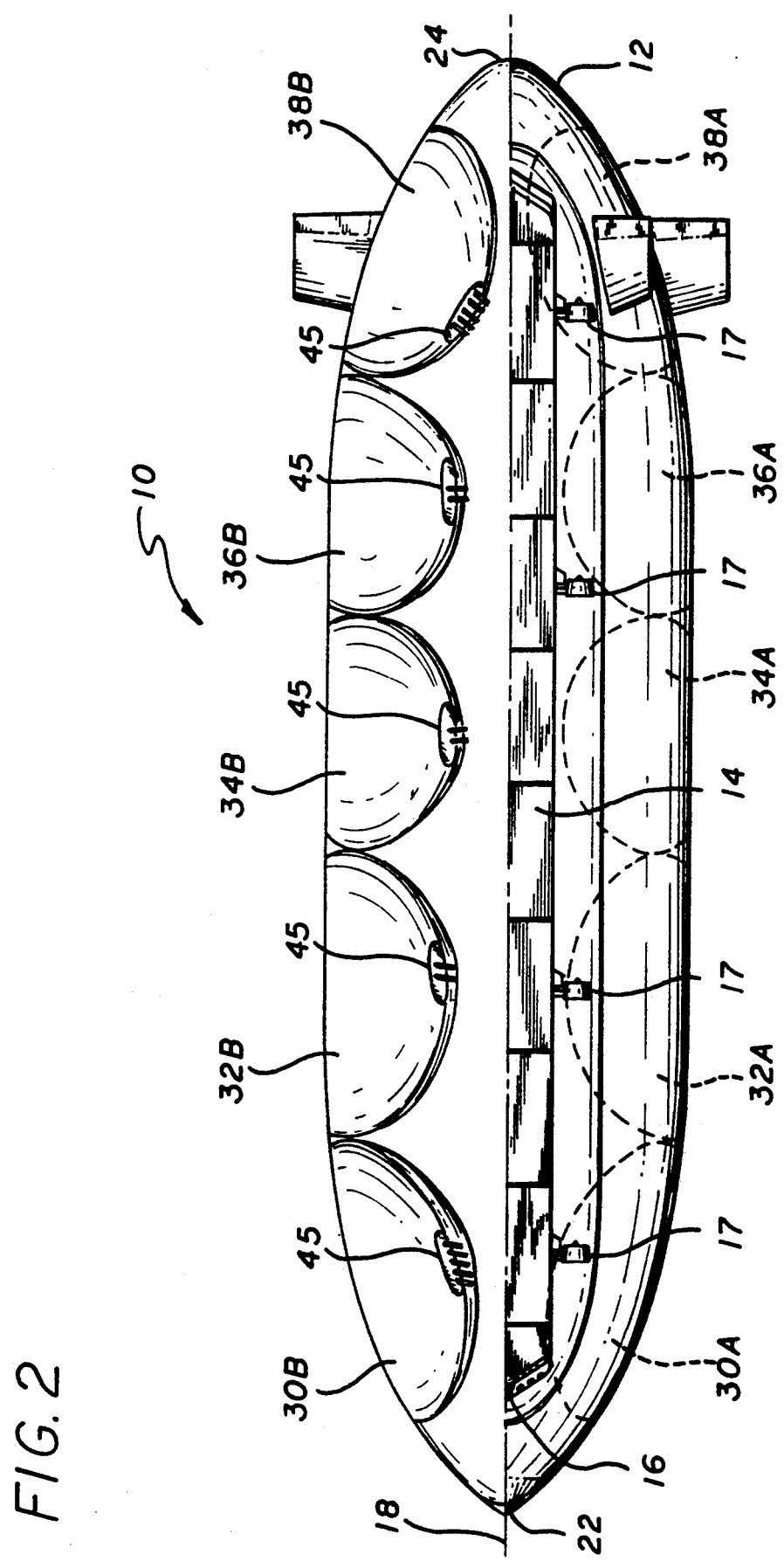
FIG. 2 is a bottom view of the vehicle illustrated in FIG. 1
Figure 3:
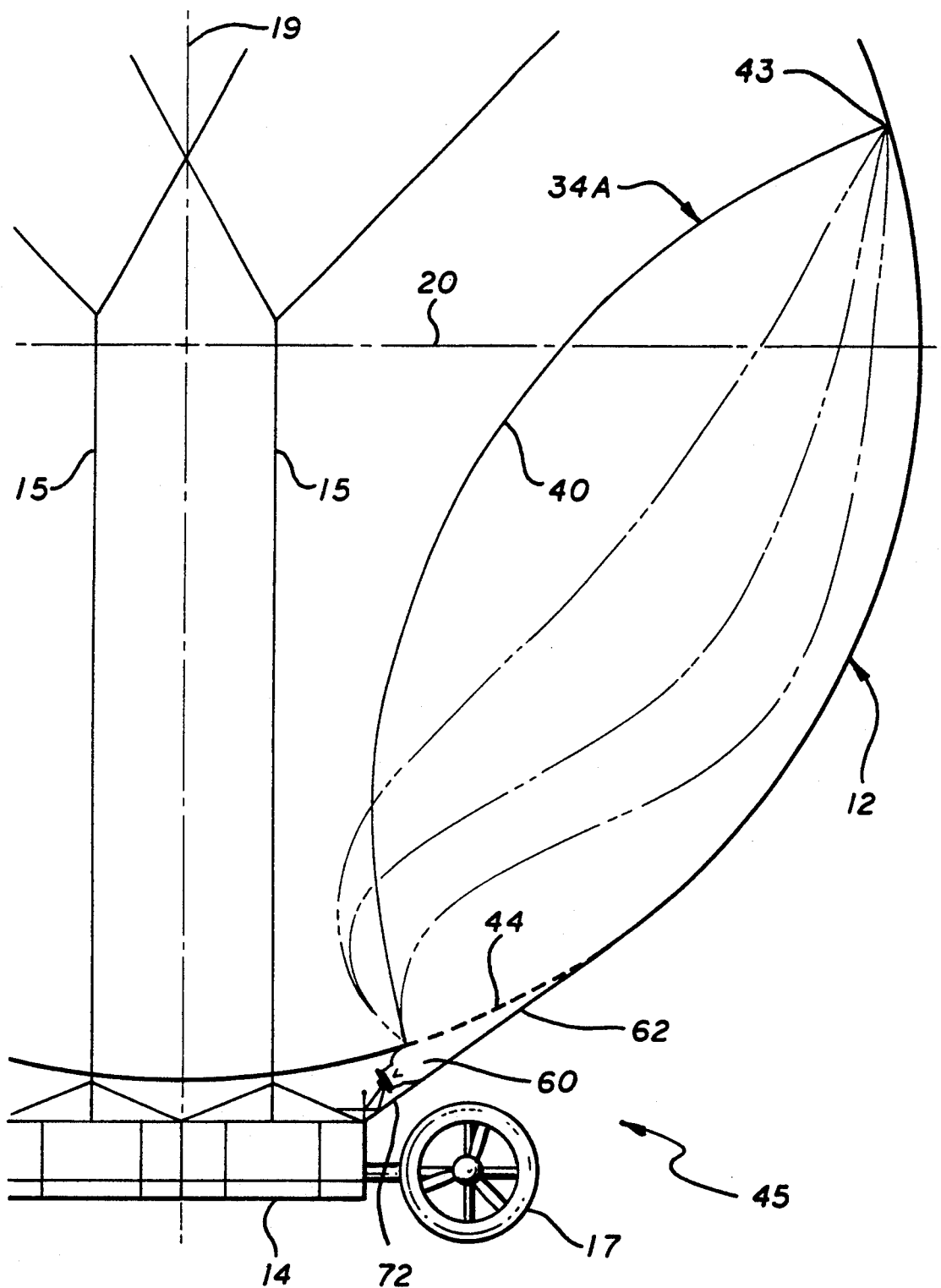
FIG. 3 is a partial cross-sectional view of the vehicle shown in FIG. 1 taken along the line 3—3.

Referring to FIG. 1 through 3, a lighter-than-air vehicle, generally referred to by numeral 10 is illustrated that includes a gasbag 12 and gondola (cargo compartment) 14 suspended therebelow by a cable suspension system 15. The gondola 14 includes a flight station 16 and a plurality of propulsion systems 17 mounted thereon. The gasbag includes a longitudinal axis 18, vertical axis 19 and lateral axis 20. The vehicle 10, as shown, is a non-ridged design; however, the subject invention could be used on ridged designs as well. Thus the vehicle depicted is for purposes of illustration only. Disposed within the gasbag 12, from the nose 22 to tail 24, are a plurality of ballonets located on either side of the longitudinal axis 16 in equal numbers and indicated by numerals 30A and B, 32A and B, 34A and B, 36A and B, and 38A and B. Each ballonet is formed from a flexible sheet 40 joined at its periphery 43 to a portion of the wall 44 of the gasbag 12, thus making the wall part of each ballonet. Referring particularly to FIG. 3 it can be seen that the ballonet 34A is illustrated in various stages of inflation. Note that such a placement of ballonets eliminates interference with the cargo compartment suspension system 15.

Still referring to FIGS. 1-3 and additionally to FIGS. 4 and 5, each ballonet includes a ballonet pressurization system 45. The pressurization system 45, for example, for the ballonet 34A, includes a plurality of fans 46 mounted by stands 48 to the cargo compartment 14. The inlet port 50 is coupled to ambient atmosphere and the outlet port 51 incorporates a one way check valve 52. A plurality of holes 54 are provided in the wall 44 that are in communication with the interior of the ballonet 34A. A manifold 60 having a structurally ridged diffuser portion 62 is coupled to the wall 44 covering the holes 54. The manifold 60 includes a plurality of flexible inlet ducts 64 that couple to the outlet ports 51 of the fans 46. Butterfly valves 70 are mounted in the diffuser portion 62 that are opened for de-pressurizing the ballonet 34A. A porus screen 72 extends from the manifold 60 to the cargo compartment 14 that, while providing a cover, allows for the free flow of air into the fans 46.

The ballonets at the nose 22 (ballonets 34A and 34B) and at the tail (ballonets 38A and 38B) are larger than the interior ballonets. Thus a larger number of fans are required. Note that, on the vehicle illustrated, more than one fan is required for each ballonet; however, on smaller vehicles one fan may be sufficient as well as only one butterfly valve for venting. Furthermore, a single manifold was illustrated coupled to a plurality of fans. However, a series of manifolds, each coupled to a signal fan could be used, but the former approach is preferred.

Because water is likely to collect in the ballonets, a drain system is provided. As illustrated in FIG. 4, such a capability is provided by a line 80 located at the bottom of the ballonet. A valve 83, in conjunction with a pump 84, provide such a system.

The advantages of the subject ballonet system are numerous. First of all, by providing holes in the wall of the gasbag in conjunction with a manifold, large internal ducting coupling the fans to individual ballonets is eliminated saving weight and cost. Also illustrated are large inlet ducts that would be required if the fans were located within the cargo compartment. Additionally, it allows the pressurization fans and vent valves to be positioned in very accessible locations allowing rapid repair or replacement.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft industry and, in particular, to those industries manufacturing lighter-than-air vehicles.

We claim:

1. A ballonet system for a lighter-than-air-vehicle, the vehicle having a lift producing gasbag having a longitudinal, vertical and lateral axis, the ballonet system comprising:
   a plurality of ballonets located within the gasbag positioned along the longitudinal axis and on each side of the vertical axis in equal numbers, each of said ballonets comprising a flexible sheet joined at its periphery thereof to a portion of the wall of the gasbag;
   a ballonet pressurization system coupled to each ballonet for pressurizing said ballonets with air, said pressurization system comprising;
      said portion of the wall of the gasbag forming said ballonet having a plurality of holes therethrough;
      a manifold having an inlet port, said manifold joined to said wall covering said holes therein and adapted to diffuse the pressurized air entering therein;
      at least one fan having an inlet port coupled to ambient atmosphere and an outlet port coupled to said inlet port of said manifold for providing pressurized air to the interior thereof; and
      a check valve located in said outlet port of said fan for preventing air from flowing from said interior of said manifold out said inlet port of said fan; and
   a ballonet venting system for venting the interior of said ballonet to ambient atmosphere.

2. The ballonet system as set forth in claim 1 wherein the vehicle includes a cargo compartment suspended underneath the gasbag, said ballonet system further comprising:
   said manifold is structurally ridged with said inlet port thereof made of a flexible material;
   said fan mounted on said cargo compartment and said outlet of said fan coupled to said flexible inlet port of said manifold;
   such that relative movement between said manifold and said fan is absorbed by said flexible inlet.

3. The ballonet system as set forth in claim 2 wherein said venting system is located in said manifold.

4. The ballonet system as set forth in claim 3 wherein said venting system comprises a butterfly valve.

5. The ballonet system as set forth in claim 4 further comprising means to drain said ballonet of liquids contained therein.

6. The ballonet system as set forth in claim 5 wherein said means to drain said ballonet of liquids contained therein comprises:
   a drain tube coupled to the bottom of the ballonet;
   a valve mounted in said drain tube; and
   pump means to drain said ballonet.

* * * * *